United States Patent
Fu et al.

(10) Patent No.: US 7,561,530 B2
(45) Date of Patent: Jul. 14, 2009

(54) EXECUTING SYSTEM AND EXECUTING METHOD OF INTELLIGENT RULE BASE SERVICE

(75) Inventors: Li-Dien Fu, King-shya Township, Kingmen County (TW); Kuo-Sue Lo, Hsinchu (TW); Cheng-Wei Huang, Jhonghe (TW); Meng-Ru Tu, Pingjhen (TW); Jen-Yau Kuo, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 495 days.

(21) Appl. No.: 11/373,583

(22) Filed: Mar. 9, 2006

(65) Prior Publication Data
US 2007/0174077 A1    Jul. 26, 2007

(30) Foreign Application Priority Data
Dec. 30, 2005    (TW)    ............... 94147509 A

(51) Int. Cl.
*H04L 12/28*    (2006.01)
(52) U.S. Cl. ....................... 370/252; 370/241
(58) Field of Classification Search .......... 705/400, 705/401, 402; 717/100, 114, 117; 370/241, 370/252
See application file for complete search history.

(56) References Cited

U.S. PATENT DOCUMENTS

| | | | |
|---|---|---|---|
| 2006/0085423 A1* | 4/2006 | Barsness et al. | 707/10 |
| 2006/0185002 A1* | 8/2006 | Bachmutsky et al. | 726/4 |
| 2008/0215386 A1* | 9/2008 | Eder | 705/7 |

FOREIGN PATENT DOCUMENTS

TW    448387    8/2001

* cited by examiner

*Primary Examiner*—Chi H Pham
*Assistant Examiner*—Fan Ng
(74) *Attorney, Agent, or Firm*—J.C. Patents

(57) ABSTRACT

An executing system and executing method of intelligent rule base service (IRBS) is provided. The executing system uses a rule base service interface for receiving a service request content which includes a header from a rule base service module, and obtains a proper rule from the rule base according to the header when a rule component receives the service request content. Finally, a rule application component applies the received rule on a part of the service request content needed to be processed to obtain and output a processing result.

6 Claims, 3 Drawing Sheets

EXECUTING SYSTEM AND EXECUTING METHOD OF INTELLIGENT RULE BASE SERVICE

CROSS-REFERENCE TO RELATED APPLICATION

This application claims the priority benefit of Taiwan application serial no. 94147509, filed on Dec. 30, 2005. All disclosure of the Taiwan application is incorporated herein by reference.

BACKGROUND OF THE INVENTION

1. Field of Invention

The present invention relates to an executing system and executing method of a rule base service, and more particularly, to an executing system and executing method of an intelligent rule base service (IRBS) based on SESP.

2. Description of Related Art

SESP (System Engineering Service Platform) is a method and system for integrating enterprise collaboration during a PLM (Product Lifecycle Management). The SESP can establish a system integration environment between the customers, center factory, and suppliers, provide an inter-enterprise collaboration platform, and exchange information in real time in the system integration environment during an entire product lifecycle, such that a system integration method and environment of collaborative management, collaborative research and development, collaborative manufacturing, and collaborative marketing among the enterprise, suppliers, and customers is achieved.

However, although SESP defines a good collaboration information exchange mechanism, the inter-enterprise collaboration flow still cannot achieve complete automation due to human limits. Common human limits are, for example: each enterprise in the collaboration system must observe some common laws and regulations; each enterprise in the collaboration system uses different specific terms or phrases, and manual translation is required in the transaction process; or transactions fulfilling particular conditions must apply some transaction rules mechanically, for example, an order of an amount larger than a certain amount can have a discount or its shipment priority can be raised.

The present general decision server relates to using a scalable access filter together with other similar access filters in a virtual private network to facilitate control. The information resources provided by many servers in the network are accessed by users at many clients in the network. Each access filter uses a local copy of an access control database to determine whether an access request is put forward by a user. Modifications made by the administrator in the local copy are propagated to other local copies. Each user is belonged to one or more user groups, and each information resource is belonged to one or more information sets. Access is permitted or rejected according to an access decision, and the decision defines access according to many user groups and information sets. Similarly, administrator privileges are determined by administrative policies. Only if the identification mode of the user and the trust level of the path in the network when accessing are enough to deal with the sensitivity level of the information resource is further access permitted.

A decision support system (DSS) applied as an assistant is a semi-intelligent information system. It is essentially an information system comprising a mode base, a database, a decision support generator, and a user interface, and is applicable to aid the decision for solving the semi-structural problem in some particular field. However, the DSS is limited to be used inside an enterprise, and also is an island information system, which is difficult to be integrated with other existing systems. Moreover, the DSS only has a fixed, inexpansible rule base, and can only passively provide users with a decision aid. Due to these limits, it is difficult for the DSS to produce efficacy rapidly in the enterprise affair flow.

In summary, the existing expert system and DSS are substantively independent software, and the main use thereof is limited to being applied in an expendable or particular field. Moreover, although the present decision server can be extended as a set of multiple decision servers, it essentially obtains and uses the local copy at each client. Therefore, the present decision system is limited in the management of the rule base, and also lacks the capability to be integrated with a single or multiple external systems because of the enclosed environment.

Under this background, it can be deduced that an automatic decision processing mechanism which can be integrated in the collaboration flow is needed in the industry.

SUMMARY OF THE INVENTION

Accordingly, one object of the present invention is to provide an executing system of an intelligent rule base service (IRBS), which can actively process a rule validation required in a normal information exchange, and the rules in the rule base can be dynamically adjusted (added or deleted) in a timely manner according to the existing circumstances of the industry or the enterprise.

Another object of the present invention is to provide an executing method of the IRBS, which is provided with the ability to actively process rule validations required in normal information exchange and translate different specific terms and units.

Therefore, the present invention provides an executing system of an IRBS, which comprises a rule base service interface, a rule base, a rule component, and a rule application component. The rule base service interface is coupled to the rule base service module to receive the service request content transmitted by the rule base service module. The service request content comprises a header which records each content characteristic of the service request content. When receiving the aforementioned service request content, the rule component obtains a proper rule from the rule base stored with rules according to the header, and then, transmits a part of the service request content needed to be processed, the proper rule obtained previously, and a service trigger signal. The rule application component receives the part of the service request content needed to be processed and the proper rule output by the rule component according to the service trigger signal, and applies the received rule on the part of the service request content needed to be processed so as to obtain and output a processing result for use.

In an embodiment of the present invention, the executing system of the rule base service further comprises a rule summarizing component. The rule summarizing component receives the aforementioned processing result, integrates the processing result as a process report form, and transfers the process report form to the rule base service module through the rule base service interface.

In another embodiment of the present invention, the executing system of the rule base service can further comprise a rule management component and an external rule base interface. The rule management component is coupled to the rule base to operate the content of the rules stored in the rule base. The external rule base interface is coupled to more than one external rule bases, such that the rules in the external rule bases can be input into the rule management component. The rule management component adds the input rule to the rule base through the operation carried out to the rule base.

From another aspect, the present invention provides an executing method of the IRBS. In the executing method, a service request content is received at first, wherein the service request content records each content characteristic of the service request content by a header. After receiving the service request content, a corresponding proper rule is obtained according to the header, and the part of the service request content needed to be processed is processed by using the obtained rule to obtain and output a processing result.

In an embodiment of the present invention, when obtaining the corresponding proper rule according to the header, it is determined whether it is required to obtain a rule or not according to the header at first; and when it is required to obtain a rule, the corresponding proper rule is further obtained according to the header. Moreover, the aforementioned service request content can be a rule automatic validation in the enterprise flow integration, an information content translation in the enterprise flow integration, an independent rule validation, an independent information content translation, a supply of sum report, an extraction and input of external rules, or a manual management rule.

The present invention contains the related information in the header of the service request content and actively detects the header, therefore, it can actively process the rule validation required in a normal information exchange. Furthermore, the rules in the rule base can be dynamically adjusted timely according to the existing circumstance of the industry and enterprise through the operation of the rule management component and the external rule base interface. Accordingly, the automation level of the collaboration among industrial allies can be further raised.

In order to make the aforementioned and other objects, features and advantages of the present invention comprehensible, a preferred embodiment accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are input in and constitute a part of this specification. The drawings illustrate embodiments of the invention and, together with the description, serve to explain the principles of the invention.

DESCRIPTION OF EMBODIMENTS

Figure 1:
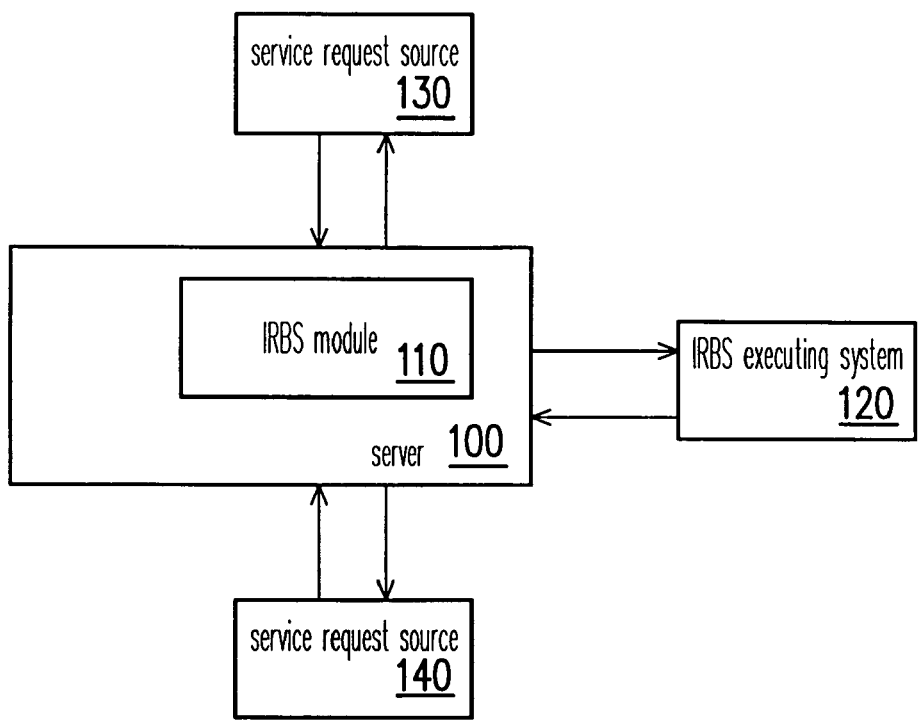
FIG. 1 is a schematic view of the relation between the present invention and SESP.

Referring to FIG. 1, it is a schematic view of the relation between the present invention and SESP. An executing system 120 of an intelligent rule base service (IRBS) provided by the present invention is used to process a service request content transmitted by an IRBS module 110. The IRBS module 110 is established on an SESP server 100, and receives service request contents from a service request source 130 or 140 through the SESP server 100. The applicant has provided an example about the communication and interaction between the IRBS module 110 and the SESP server 100 in a previous application (Taiwan Application No. 92135700), the content of the application should be incorporated herein for reference, and will not be further explained in the specification.

Figure 2:
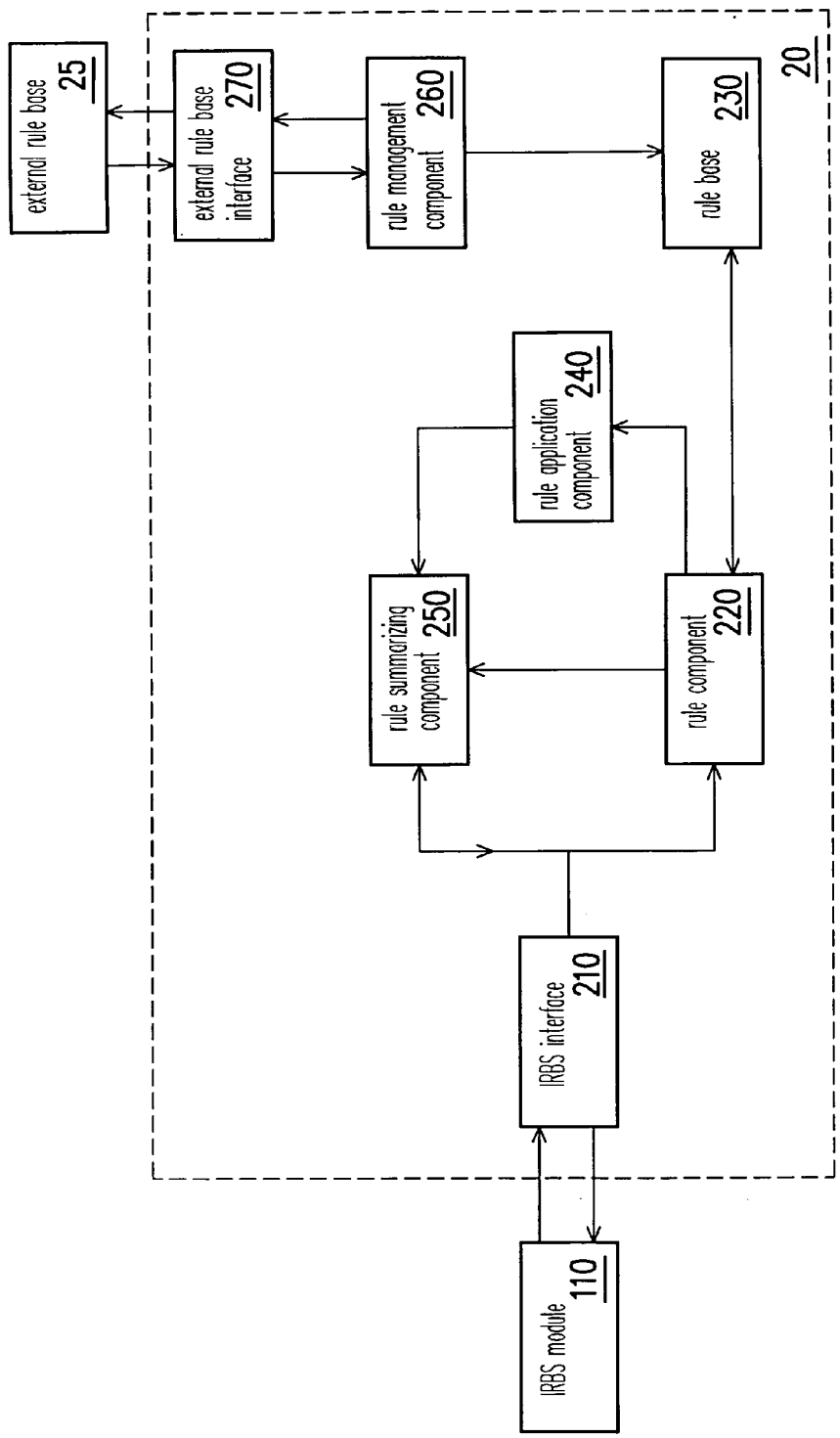
FIG. 2 is a circuit block diagram of an executing system of an IRBS according to an embodiment of the present invention.

Referring to FIG. 2, it is a circuit block diagram of an executing system of an IRBS according to an embodiment of the present invention. In the present embodiment, an executing system 20 of IRBS comprises an IRBS interface 210, a rule component 220, a rule base 230, a rule application component 240, a rule summarizing component 250, a rule management component 260, and an external rule base interface 270. The basic function provided by the present invention can be achieved simply by an inter-operation among the IRBS interface 210, the rule component 220, the rule base 230, and the rule application component 240.

Figure 3:
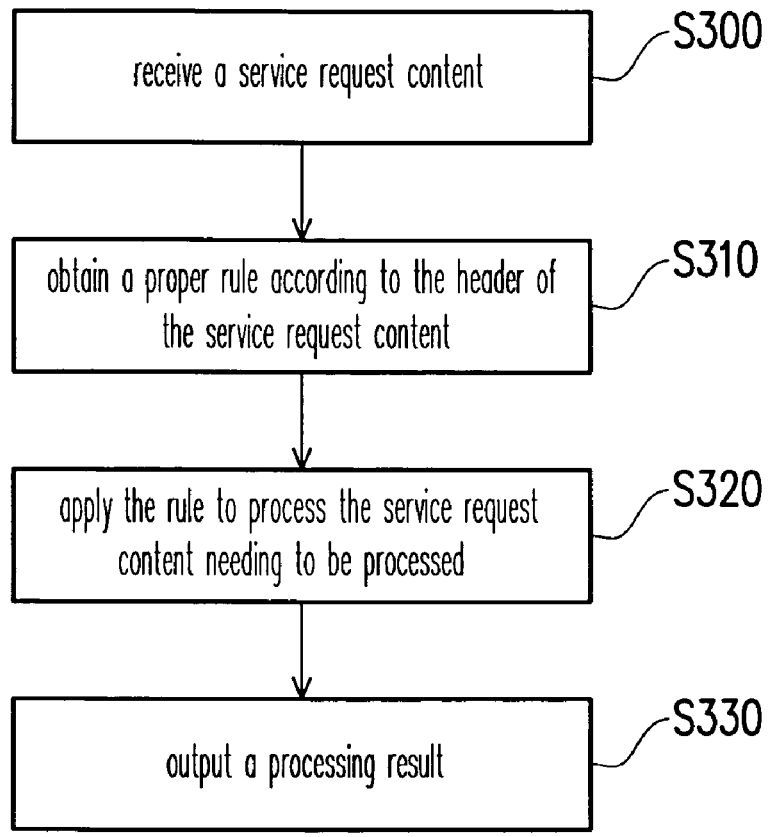
FIG. 3 is a flow chart of an executing method of an IRBS according to an embodiment of the present invention.

In order to make the technology of the present invention to be easily understood by those skilled in the art, refer to FIG. 3 together, wherein a flow chart of an executing method of the IRBS according to an embodiment of the present invention is shown. In the present embodiment, the IRBS interface 210 receives a service request content transmitted from the outside, e.g. the service request source 130 or 140 in FIG. 1, from the IRBS module 110, and transfers the service request content to the rule component 220 (step S300). After receiving the service request content, the rule component 220 automatically determines an operating procedure to be carried out according to a header of the service request content, comprising determining whether the service required by the service request content needs to obtain a rule or not, the rule type required to be obtained in validation, and the like (step S310). To achieve the object, the rule content should be designed together with the header of the corresponding service request content.

For example, a possible rule content is as follows:
[ID];[ELEMENT].[ATTRIBUTE][BOOLEAM];[ACTION]

wherein, ID (identifier) represents the number of this rule, ELEMENT (constituent element) and ATTRIBUTE1 (the first attribute) are the part to be examined by the rule, and ACTION (action operation) is the operation to be carried out by the rule. Therefore, if the rule is used, a particular number should be designated in the header of the service request content, such that the rule component 220 can obtain a corresponding rule from the rule base 230 according to the number. Furthermore, when the service request content comprises ELEMENT, ATTRIBUTE1, etc., the rule can determine that the BOOLEAM (Boolean value) is "true", and execute the operation defined by the ACTION.

Moreover, in another embodiment, the rule can also comprise a second attribute ATTRIBUTE2 and a Reference ID, such that a more diversified determination can be carried out. For example, when a service request content is determined by applying the rule, it can be determined whether to carry out a corresponding action or not according to whether the relation between ATTRIBUTE1 and ATTRIBUTE2 conforms the content of BOOLEAM or not. In addition to the above manner, a further determination can be made according to a corresponding condition of the Reference ID.

To sum up, after obtaining a proper rule from the rule base 230 in the above manner, the rule component 220 will output the part of the service request content needed to be processed and the obtained rule after sending a service trigger signal. The service trigger signal is used to inform the rule application component 240 to receive (or obtain actively) the part of the aforementioned service request content needed to be processed and the corresponding rule from the rule component 220, apply the rule to the service request content in the above manner for carrying out a corresponding operation, and obtain a processing result (step S320).

The processing result generated by the rule application component 240 can be output to the object in need of it directly through the IRBS interface 210 and the IRBS module 110 (step S330), or further transmitted to the rule summarizing component 250 for further processing.

After receiving the processing result generated by the rule application component 240, the rule summarizing component 250 will store it as a part of historical process information. Of course, the processing result can be processed by the rule summarizing component 250 to produce a more comprehensible report form, and then the report form is output to the object in need of it. Besides, the rule summarizing component 250 can process the processing results of different rules to generate a comparison report and output it according to the request. Furthermore, the aforementioned request or service request content can be transmitted to the rule summarizing component 250 directly by the IRBS interface 210, or provided by the rule component 220.

Other than the above components, the present invention can further use a rule management component 260 to dynamically manage the rules in the rule base 230. The management can comprise deleting, modifying, adding, sequencing, and other operations. Moreover, the rule management component 260 can also retrieve the rules included in the connected external rule base 25 through the external rule base interface 270, convert the retrieved rules to rules applicable to the rule base 230 according to the predetermined format, and store the converted rules in the rule base 230.

It should be illustrated that the executing system or executing method of the rule base service provided by the present invention can accept service request content at least including a rule automatic validation in the enterprise flow integration, an information content translation in the enterprise flow integration, an independent rule validation, an independent information content translation, a supply of sum report, an extraction or input of external rules, a manual management rule, and other application layers, as long as the format of the service request content is compatible.

In summary, according to the present invention, the rule validation required by a normal information exchange can be actively processed, the rules in the rule base can be dynamically adjusted timely according to the existing circumstance of industry or enterprise through the operation of the rule management component and the external rule base interface; therefore, the automation level of the collaboration among industrial allies can be further raised.

It will be apparent to those skilled in the art that various modifications and variations can be made to the structure of the present invention without departing from the scope or spirit of the invention. In view of the foregoing, it is intended that the present invention cover modifications and variations of the invention provided they fall within the scope of the following claims and their equivalents.

What is claimed is:

1. An executing method of an intelligent rule base service (IRBS), comprising:
   receiving a request of a rule application service by using a server, wherein the request records the characteristics of the request by a header;
   obtaining a corresponding proper rule according to the header;
   processing a partial content of the request needed to be processed by using the rule to obtain a processing result; and
   outputting the processing result and storing the processing result as a part of a historical process information,
   wherein when the header records the request including the supply of sum report, the executing method further comprises obtaining a requested sum report form type and a rule type required by the requested sum report form from the request, when the requested sum report form type is the historical process information, finding out each processing result corresponding to the rule type required by the requested sum report form from the historical process information, and outputting each found processing result as a report form.

2. The executing method of the IRBS as claimed in claim 1, wherein when obtaining the corresponding proper rule according to the header, further comprising:
   determining whether it is required to obtain a rule or not according to the header; and
   obtaining a corresponding proper rule according to the header when it is required to obtain a rule.

3. The executing method of the IRBS as claimed in claim 1, wherein the request comprises one of a rule automatic validation in the enterprise flow integration, an information content translation in the enterprise flow integration, an independent rule validation, an independent information content translation, a supply of sum report, an extraction and input of external rule, and a manual management rule.

4. The executing method of the IRBS as claimed in claim 1, wherein when the header records the request including the extraction and input of external rule, further comprising:
   searching designated external rule bases;
   triggering an external rule base interface to extract the rule content therein; and
   adding the extracted rule content as one of the rules.

5. The executing method of the IRBS as claimed in claim 1, wherein the rule comprises an ID, an ELEMENT, an ATTRIBUTE1, and an ACTION; ID represents the rule type, and when the request is determined having ELEMENT and ATTRIBUTE1, the ACTION is executed.

6. The executing method of the IRBS as claimed in claim 1, wherein the rule further comprises an ATTRIBUTE2 and a BOOLEAM, and when the request is determined having ELEMENT and ATTRIBUTE1, and the logic relation between ATTRIBUTE1 and ATTRIBUTE2 conforms BOOLEAM, the ACTION is executed.

* * * * *